US009843713B2

United States Patent
Kim et al.

(10) Patent No.: US 9,843,713 B2
(45) Date of Patent: Dec. 12, 2017

(54) SYSTEMS AND METHODS FOR VIDEO COMMUNICATION

(71) Applicant: NEBULYS TECHNOLOGIES, INC., Frederick, MD (US)

(72) Inventors: Kyung-Hee Kim, McLean, VA (US); Paul C. Shim, McLean, VA (US); Jiseok Lee, McLean, VA (US)

( * ) Notice: Subject to any disclaimer, the term of this patent is extended or adjusted under 35 U.S.C. 154(b) by 0 days.

(21) Appl. No.: 14/537,200

(22) Filed: Nov. 10, 2014

(65) Prior Publication Data

US 2015/0288923 A1  Oct. 8, 2015

Related U.S. Application Data

(60) Provisional application No. 61/973,871, filed on Apr. 2, 2014.

(51) Int. Cl.
*H04N 7/14* (2006.01)
*H04N 5/232* (2006.01)

(52) U.S. Cl.
CPC ..... *H04N 5/23216* (2013.01); *H04N 5/23206* (2013.01); *H04N 5/23219* (2013.01); *H04N 5/23296* (2013.01); *H04N 7/142* (2013.01)

(58) Field of Classification Search
USPC .. 348/14.05, 14.08, 14.09, 14.12, 69, 208.3, 348/211.9, 211.11, 211.14
See application file for complete search history.

(56) References Cited

U.S. PATENT DOCUMENTS

| 5,400,069 | A | 3/1995 | Braun et al. | |
| 5,500,671 | A * | 3/1996 | Andersson | H04N 7/15 348/14.1 |
| 5,675,376 | A | 10/1997 | Andersson et al. | |
| 8,593,503 | B2 | 11/2013 | Bolle | |
| 2001/0037508 | A1* | 11/2001 | Hindus | H04L 29/06 725/105 |
| 2012/0257004 | A1 | 10/2012 | Smith et al. | |
| 2013/0242120 | A1* | 9/2013 | Venkatraman | H04N 5/225 348/208.4 |
| 2014/0111601 | A1* | 4/2014 | Lee | H04N 7/147 348/14.08 |

FOREIGN PATENT DOCUMENTS

| CA | 2830492 | 10/2012 |
| WO | 2011/083092 | 7/2011 |

* cited by examiner

*Primary Examiner* — Yosef K Laekemariam

(57) ABSTRACT

Embodiments of the present disclosure provide systems and methods for controlling a camera based on movement of a user detected by another camera. A system may include a first camera capturing images of a user, a display located in the vicinity of the first camera, the display displaying, in real time, video received from a second camera disparately located from the first camera. The system may include one or more processors coupled to the first camera, the second camera and the display, the processor(s) analyzing the images captured by the first camera to determine head and eye movement of the user, determining camera settings for the second camera based on the determined head and/or eye movement of the user, and transmitting the determined camera settings to the second camera.

19 Claims, 8 Drawing Sheets

100

SIDE VIEW

TOP VIEW

300

500

600

700

800

SYSTEMS AND METHODS FOR VIDEO COMMUNICATION

CROSS-REFERENCES TO RELATED APPLICATIONS

The present application claims priority to U.S. Provisional Application No. 61/973,871, filed on Apr. 2, 2014, the entirety of which is incorporated by reference herein.

BACKGROUND

The subject matter of this application is directed to camera(s) and more specifically to controlling camera settings for video communication based on detected movement of a user with another camera.

Communication between users located in different locations can be performed using video conferencing systems. Typically, the video conference systems include a video camera and a display provided at each location. The video camera at one location captures video and transmits the video for display on the display at the other location. A microphone and speakers may also be provided at each location to record and playback recorded audio signals.

In a typical video conferencing system, a stationary camera with fixed settings is used to capture the video during the video conference. Thus, during the video conference the captured scene in the video remains the same. To change the captured scene during the video conference, a camera operator is required at the location of the camera to manually position the camera and control the camera settings. However, the camera operator manually controlling the camera does not always capture a scene that a user at another location may desire to view on the display.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Embodiments of the present disclosure provide systems and methods for controlling a camera based on movement of a user detected by another camera. According to one embodiment, a system may include a first camera capturing images of a user, a display located in the vicinity of the first camera, the display displaying, in real time, video received from a second camera disparately located from the first camera. The system may include one or more processors coupled to the first camera, the second camera and the display, the processor(s) analyzing the images captured by the first camera to determine head and eye movement of the user, determining camera settings for the second camera based on the determined head and/or eye movement of the user, and transmitting the determined camera settings to the second camera.

The systems and methods of the present disclosure may provide for a realistic video communication by synchronizing between user's movement and the communication peer's camera(s) over a network. These systems and methods may be used in various applications and are not limited to the examples discussed in this application. For example, the exemplary systems and methods may be used in an online training and education system to provide realistic and highly interactive communication between a teacher and one or more students. Online conferencing between businesses to business (B2B) (Business to Business) or between a business and consumer may utilize the methods and systems of this disclosure for realistic and highly interactive communication. The systems and methods of this disclosure may also be used in video communication between a medical provider (e.g., doctor or a nurse) and a patient who is remotely located from the medical consultant or is isolated from the medical consultant for medical reasons. Other objectives and advantages of the present invention will become obvious to the reader and it is intended that these objectives and advantages are within the scope of the present disclosure.

Figure 1:
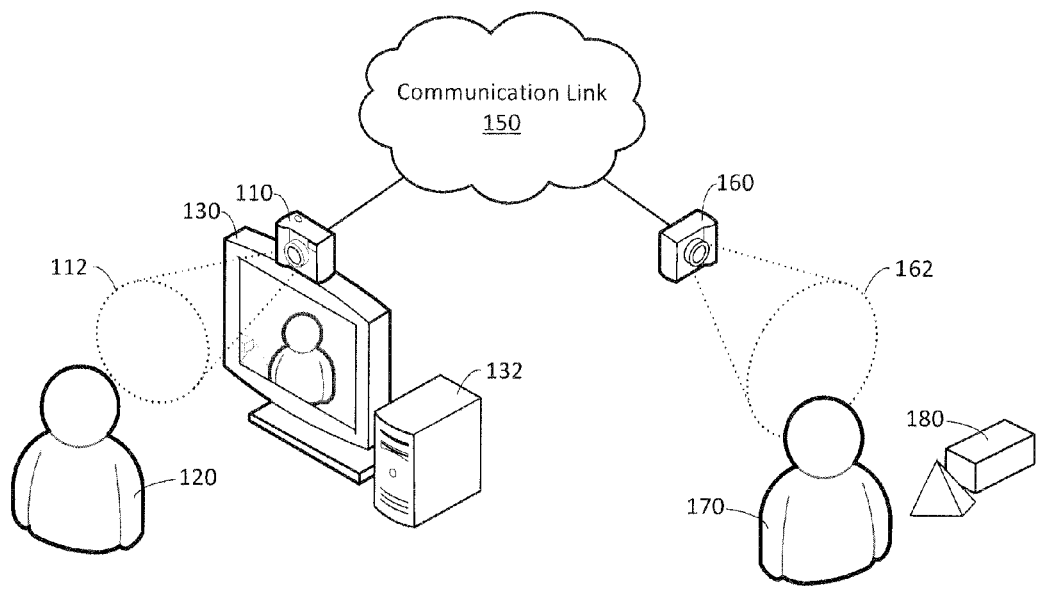
FIG. 1 illustrates a camera control system according to an embodiment of the present disclosure.

FIG. 1 illustrates a camera control system 100 according to an embodiment of the present disclosure. The camera control system 100 may include a first camera 110 capturing images of a first user 120, a display 130, and a second camera 160 capturing images of a scene in proximity of the second camera 160. The images captured by the second camera 160 may be transmitted over a communication link 150 and displayed on the display 130.

The images displayed on the display 130 may be displayed based on movement of the first user 120 determined from the images captured by the first camera 110. For example, the images of the first user 120 may be captured by the first camera 110 and analyzed to determine head movement and/or eye movement of the first user 120. Based on the head movement and/or eye movement of the first user 120, one or more camera settings of the second camera 160 may be modified. Modification of the one or more camera settings of the second camera 160 may change what scene and/or how the scene is captured by the second camera 160. For example, based on the head movement and/or eye movement of the first user 120, one or more of position, pan, tilt, and/or zoom settings of the second camera 160 may be controlled to change the scene to be captured and/or the perspective of the captured scene. In one embodiment, the position of the second camera 160 may be adjusted based on the head movement, and the pan, tile, and/or zoom settings of the second camera 160 may be adjusted based on the eye movement.

In another embodiment, the video including a plurality of images captured by the second camera 160 may be modified based on the head movement and/or eye movement of the first user 120. For example, based on the head movement and/or eye movement of the first user 120, a portion of the captured images to be displayed on the display 130 may be changed and/or the perspective of the image to be displayed on the display 130 may be modified.

In one embodiment, based on the head movement and/or eye movement of the first user 120, one or more camera settings of the second camera 160 may be modified and the image captured by the second camera 160 may be further modified.

Displaying images on the display 130 based on the detected movement of the first user 120 may provide a more realistic video communication system as compared to conventional video conferencing systems. While conventional video conferencing systems are static, the systems of the present disclosure allow the first user 120 to have a sense of presence in the vicinity of the second camera 160 by controlling the second camera 160 to respond to the head and/or eye movement of the first user 120 in real-time. This synchronization between the head and/or eye movement of the first user 120 and the one or more camera parameters of the second camera 160, provides for real-time automatic camera control.

The first camera 110 may be a tracking camera including one or more imaging sensors capturing the movement (e.g., head and/or eye movement) of the first user 120. The first camera 110 may be a digital video camera providing video of the first user 120. The first camera 110 may be provided as part of the display 130. The images provided by the first camera 110 may be high resolution images providing sufficiently number of pixels of the user's eyes to perform eye tracking (e.g., enough pixels to distinguish between the surrounding and the head and/or between the eye cornea and pupil). The first camera 110 may be a high frame-rate camera and/or an infrared capable camera. The first camera 110 may include an IR illumination circuitry and/or LEDs.

In one embodiment, the first camera 110 may be a pan-tilt-zoom (PTZ) camera capturing image of the first user 120 and continuously adjusting a field of view 112 of the first camera 110 to follow the user 120 as the user moves outside of the field of view 112. As show in FIG. 1, the field of view 112 of the first camera 110 may be centered on the head of the first user 120 (e.g., providing images with the head and shoulders of the first user). As the first user 120 moves outside of the camera's field of view 112, the first camera 110 may be controlled to pan, tilt, and/or zoom to follow the first user 120. In another embodiment, the first camera 110 may have a fixed field of view 112. In this embodiment, the first camera 110 may include a wide angle lens (e.g., prime wide angle lens) providing a large field of view 112. In another embodiment, the first camera 110 may have fixed imaging direction and include a zoom lens with a variable focal length. In this embodiment, the focal length of the first camera 110 may be adjusted with the movement of the first user 120.

The first camera 110 may include a plurality of cameras and/or sensors positioned in the vicinity of the first user. For example, two or more cameras may be positioned in front of the user 120 to capture images that can be analyzed to provide three-dimensional coordinates of the user's features (e.g., head and/or eyes). In another embodiment, dedicated camera(s) or eye tracking sensor(s) may be provided to capture the user's eye movement and another camera may be provided to capture user's other movement (e.g., the head movement). The first camera may include firmware and software to capture images and/or capture a user's head motion, eye motion and/or point of gaze.

The display 130 may be an electronic visual display continuously displaying streaming video feeds captured by the second camera 160. The display 130 may be part of a personal computer, video conferencing endpoint or a mobile device (e.g., a smart phone, a tablet device, a laptop computer, etc.). In one embodiment, the first camera 110 and the display 130 may be part of a mobile device.

The second camera 160 may include one or more camera(s) providing a stream of images in real-time of a scene including a second user 170 and/or object(s) 180 based on the detected movement of the first user 120. The second camera 160 may be provided in the vicinity of the second user 170 and/or objects 180 and may be disparately located from the first camera 110, display 130, and the first user 120. The second camera may include firmware and software to capture a stream of images, encode the digital stream for transmission over the communication link, transmit the stream over the communication link and/or receive instructions (e.g., control signal) to control the operation of the camera.

As discussed above, the camera settings of the second camera 160 may be adjusted in response to the detected head and/or eye movement of the first user 120. In the embodiment with a plurality of cameras provided in the vicinity of the second user 170, the camera used to capture the images for display on the display 130 may be switched based on the detected head and/or eye movement of the first user 120. In one embodiment, the second camera 160 may simultaneously capture 360° with one or more cameras. In this embodiment, a portion of the captured images to be displayed on the display 130 may be selected based on the detected movement of the first user 120. In one embodiment, the second camera 160 may include a plurality of cameras capturing three-dimensional video.

As shown in FIG. 1, a processing system 132 may be associated with the first camera 110 and/or the display 130. The processing system 132 may perform the operations to process the captured images by the cameras and provide control signals or data representing the user motion to the second camera 160. For example, the processing system 132 may receive images of the first user 120 from the first camera 110 and determine the head and eye movement of the first user 120. The processing system may convert the eye and head movement into a control signal and may transmit the control signal of movement to the second camera 160 or another processor associated with the second camera. In another embodiment, based on the determined movement, the processing system 132 may determine camera settings for the second camera 160 and transmit the settings or control signals to the second camera. The processing system 132 may receive the captured images from the second camera 160 and display the received images on the display 130. When needed, the processing system 132 may further modify the received images from the second camera before displaying the images on the display 130.

The processing system 132 may include one or more processors (e.g., Central Processing Units (CPUs), processing circuitry, or microcontrollers) with execution logic that may execute instructions including one or more processes. The instructions may be stored in memory coupled to the one or more processors. In one embodiment, the processing system 132 may include a user movement capturer and analyzer, eye movement data encoder, head movement encoder, communication processor(s). In one embodiment, one or more processors of the processing system 132 may be part of the first camera 110 and/or the display 130. The one or more processors of the processing system 132 may also be part of the second camera 160. In other embodiments, the processing system 132 may be remotely located from the first camera 110, the display 130 and/or the second camera 160.

Data may be transmitted between the first camera 110, the display 130, the second camera 160, and/or the processing system 132 over the communication link 150. The communication link 150 may also couple components of the camera control system 100 to other processing systems (not shown in FIG. 1) that may be configured to perform one or more of the processes discussed in this disclosure. The data transmitted over the communication link 150 may include images and/or audio captured by the cameras 110 and 160, user movement information, camera control parameters, requests for data, and responses to requests. The data may be encoded before being transmitted over the communication link 150.

The communication link 150 may be a network. The network may include: an internet, such as the Internet; an intranet; a local area network (LAN); a wide area network (WAN); an internal network, an external network; a metropolitan area network (MAN); a body area network (BAN); a vehicle area network (VAN); a home area network (HAN); a personal area network (PAN); a controller area network (CAN); and a combination of networks, such as an internet and an intranet. The network may be a wireless network (e.g., radio frequency waveforms, free-space optical waveforms, acoustic waveforms, etc.) and may include portions that are hard-wired connections (e.g., coaxial cable, twisted pair, optical fiber, waveguides, etc.).

Figure 2A:
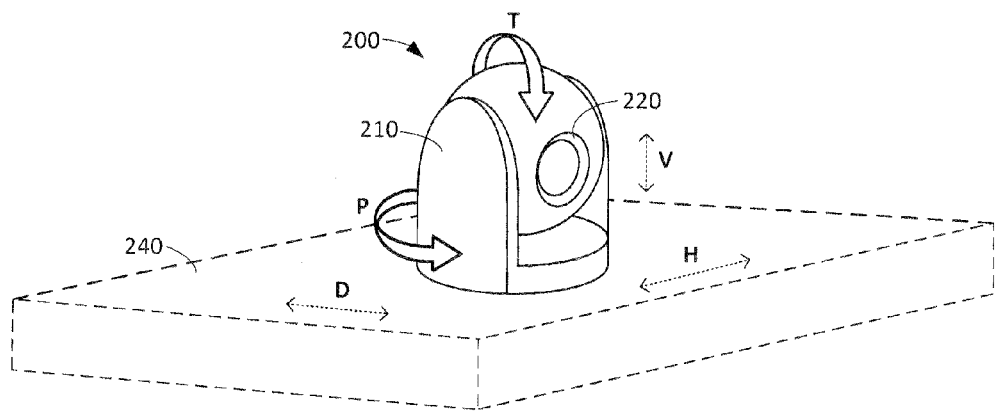
FIGS. 2A-2C illustrate a camera system according to an embodiment of the present disclosure.
Figure 2B:
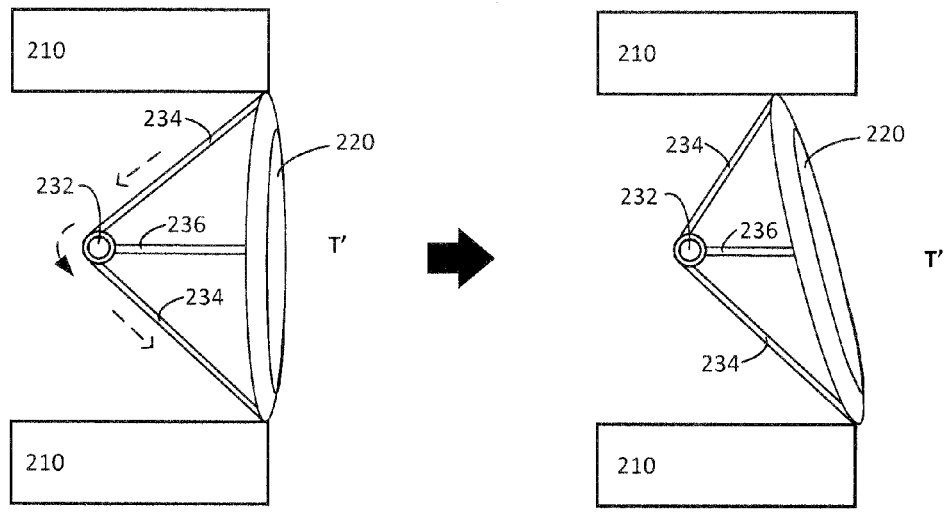
Figure 2C:
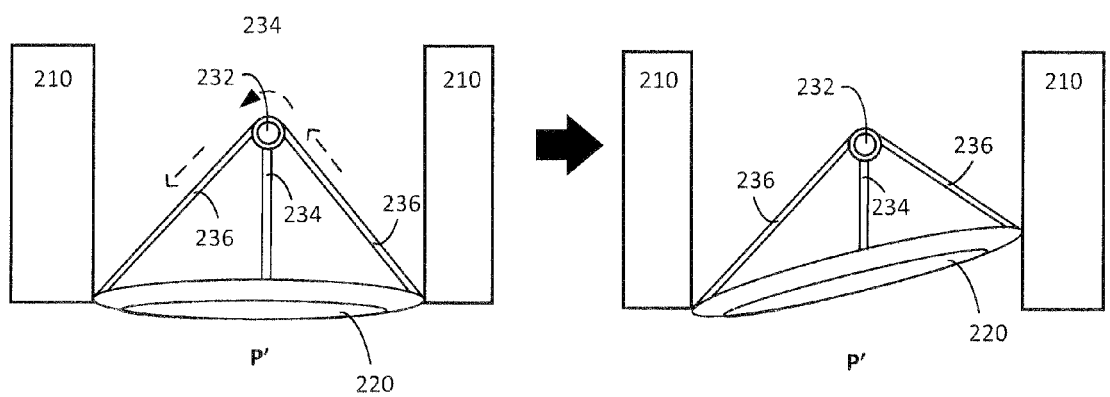

FIGS. 2A-2C illustrate a camera system 200 according to an embodiment of the present disclosure. The camera system 200 may correspond to the second camera 160 shown in FIG. 1. The camera system 200 may provide one or more mechanisms (e.g., a pan-tilt-zoom mechanism) to control the imaging direction and/or the field of the view of the camera. The camera system 200 may include a camera housing 210, an imaging sensor disposed inside the camera housing 210 and a lens 220 (e.g., zoom lens). The camera housing 210 may provide panning movement P and tilting movement T. In one embodiment, the camera housing 210 may provide the camera system 200 with 360° of panning movement P and 180° of tilt movement T.

The camera system 200 may also include one or more mechanisms to control the position of the lens 224 (e.g., pan and/or tilt) with reference to the camera housing 210. For example, as shown in FIG. 2B, a positioner 232 (e.g., a micro stepping motor) may control first linking members 234 to adjust the tilting T' of the lens 220. The tilting T' of the lens 220 may be adjusted with reference to the camera housing 210. The positioner 232 may adjust the length of the linking member(s) 234 to rotate the lens 220 in a vertical plane. As shown in FIG. 2C, the positioner 232 may control second linking members 236 to adjust the panning P' of the lens 220. The panning P' of the lens 220 may be adjusted with reference to the camera housing 210. The positioner 232 may adjust the length of the linking member(s) 236 to rotate the lens 220 in a horizontal plane. While in FIGS. 2B and 2C the same positioner 232 adjusts the tilting and panning of the lens 220, different positioners may be used to control each of the tilting T' and the panning P' of the lens 220. The imaging sensor (not shown in FIGS. 2B and 2C) may be rotated together with the lens 220. Thus, the camera housing 210 may provide a first level of rotational control (e.g., panning and tilting of the camera housing 210) and controlling the position of the lens with reference to the camera housing 210 may provide a second level of rotational control (e.g., panning and tilting of the lens with reference to the camera housing 210).

The panning and tilting of the camera housing 210 and the panning and tilting of the lens 220 may be controlled based on control signals received from a processor. The processor providing the control signals may be associated with another camera (e.g., the first camera 110 shown in FIG. 1) or may be associated with the camera system 200. The control signals may be provided based on the movement of a user captured in real-time by the other camera (e.g., the first camera 110 shown in FIG. 1).

For example, in response to the control signals, the pan settings of the camera housing 210, and/or the tilt settings of the camera housing 210 may be adjusted. Similarly, in response to the control signals, the zoom settings of the lens 220, the rotation of the lens 220 (e.g., panning and/or tilting) may be adjusted. In one embodiment, the panning and/or tilting of the camera housing 210 may be controlled based on the detected head movement of a user (e.g., the first user 120) and the panning and/or tilting of the lens 220 with reference to the camera housing 210 may be controlled based on the detected eye movement of the user. The zoom setting of the lens 220 may be controlled based on the user's eye movement and/or eye characteristics.

The arrangement of the camera housing 210 and the lens 220 is not limited to the embodiment shown in FIGS. 2A-2C. Other configurations and types of camera positioners may be used to provide rotation and/or displacement of the camera and control of the camera's field of view in response to user movement detected by another camera. In one example, a robotic arm may provide the translational and/or rotational movement of the camera. In another embodiment, the PTZ camera may be provided on a mobile platform (e.g., robotic platform) configured to move in response to the detected motion of the first user 120. In some embodiments, the field of the view of the camera may be adjusted by software (e.g., by cropping the captured image).

In another embodiment, the camera system 200 may include a camera positioner 240 to provide translational movement of the camera housing 210. The translation movement may include movement in the horizontal direction H, the depth direction D, and/or the vertical direction V. The camera positioner 240 may include a plurality of rails providing the translational movement of the camera housing 210. A first rail may provide displacement of the camera housing 210 in the horizontal direction H and a second rail may provide displacement of the camera housing 210 in the depth direction D. The camera positioner 240 may include a telescoping mechanism to provide vertical movement of the camera housing 210. In response to the control signals, the position of the camera housing 210 in the horizontal direction Y, the depth direction X, and/or the vertical direction Z may be adjusted.

One or more of the above discussed adjustments to the camera housing settings and/or the lens settings may be simulated by image processing techniques. For example, if the camera system 200 is not capable of mechanical movement to adjust the rotation of the camera housing or the lens, and the camera system 200 is able to capture a wide angle and/or high definition resolution image, the captured image may be processed to mimic the mechanical movement of the camera housing and/or the lens.

Figure 3:
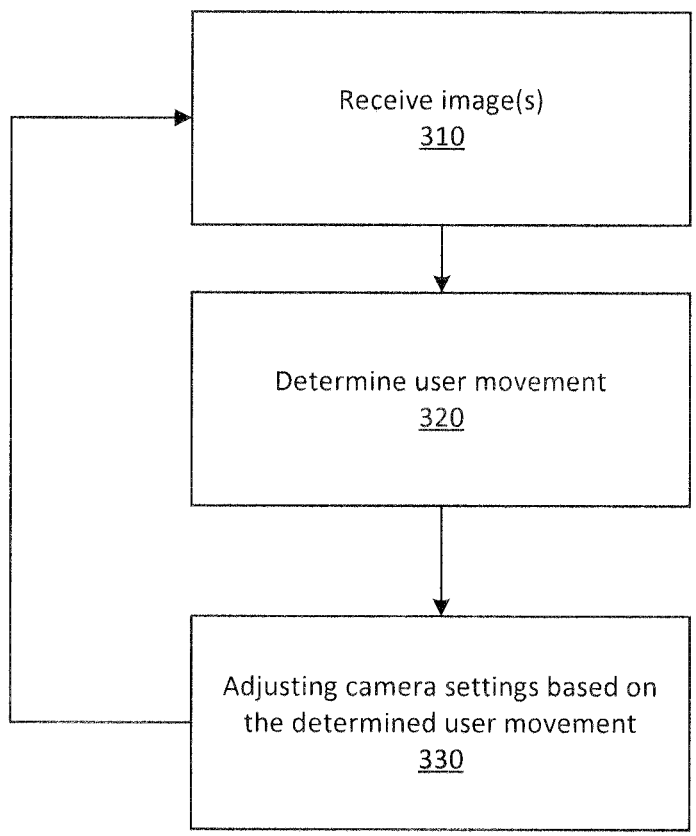
FIG. 3 illustrates a method for adjusting camera settings based on user movement according to an embodiment of the present disclosure.

FIG. 3 illustrates a method 300 for adjusting camera settings based on user movement according to an embodiment of the present disclosure. The method 300 may be performed with processor(s) associated with one or both of the cameras 110 and 160 shown in FIG. 1. The method 300 may include receiving images from a first camera 310, determining user movement 320, and adjusting camera settings based on the determined user movement 330.

Receiving images from the first camera 310 may include receiving one or more images from the first camera provided in vicinity of a user, for example first user 120. The user may be observing images captured by a second camera, located in a different location from the first camera (e.g., outside of the field of view of the first camera or the user), and displayed on a display to the user. The images may be received periodically from the first camera 110 or a continuous stream of images may be received from the first camera 110. The images may include the user in the images (e.g., head and shoulders of the user).

Determining the user movement 320 from the received images may include analyzing the images to calculate an amount of head and/or eye movement of the user. The determination of the user movement may include detecting features of the user (e.g., head and/or eyes), determining the movement of the detected features between subsequent images (e.g., adjacent images or nonadjacent image), and calculating a vector representing the movement of each of the user features. For example, a motion vector may be determined for the head movement and a motion vector may be determined for the eye movement. The head motion vector and/or the eye motion vector may represent three dimensional motions of the head and/or eyes. In other embodiment, the motion vectors may represent two-dimensional motion.

Determining the eye movement may include determining the location of the eyes and/or tracking the location of the eyes in subsequent frames to determine movement of the eyes. The eye tracking may be performed by pattern recognition, detecting corneal reflection points, shape detection, and/or edge detection. The determination of the eye movement may provide eye gaze direction. The eye gaze direction and the known position of the first camera and the display may indicate whether the user is looking at the display and/or at which portion of the display (i.e., which content displayed on the display) the user is looking. In some embodiments, the eye gaze direction may be estimated by analyzing a single image.

In one embodiment, determining the eye movement may include finding the location of the center of the pupil with reference to corneal reflection(s) of an infrared glint source. Because the surface of the cornea is nearly spherical, the position of the glint may remain approximately fixed as the pupil moves to focus on different points of interest displayed on the display.

The images captured by the first camera may also be analyzed to determine changes in facial features. For example, the images may be analyzed to determine user's blinking rate, size of user's pupils, and squinting or opening of the eyes. The camera settings may be adjusted based on such detected changes in the facial features.

Adjusting camera settings 330 may include determining camera settings based on the detected user movement extracted from images captured by the first camera. The determination may include determining whether there is sufficient head and/or eye movement to adjust existing camera settings. If there is sufficient movement, a camera setting may be adjusted to correspond to the movement of the user.

In one embodiment, a first set of setting may be adjusted in response to the detected movement of the head and a second set of setting may be adjusted in response to the detected eye movement. Some camera settings (e.g., rotation of the camera housing) may be adjusted based on both the head movement and the eye movement. For example, in response to the detected head movement, the settings controlling the physical position and/or orientation of the camera may be adjusted. In response, to the detected eye movement, the settings controlling the zoom and tilt of the camera may be adjusted. In another example, the settings of the camera housing 210 (shown in FIG. 2A) may be adjusted based on the detected head movement and the tilting and panning settings of the lens 220 (shown in FIGS. 2A-2C) may be adjusted based on the detected eye movement. Table 1 illustrates examples of camera settings that may be adjusted in response to corresponding user movement.

TABLE 1

| User Movement (with reference to camera capturing images of the user) | Camera Settings |
|---|---|
| Vertical head motion | Rotation of camera housing in the vertical direction |
| Horizontal head motion | Rotation of camera housing in the horizontal direction |
| Depth direction head motion | Zoom settings of the lens |
| Head rotation | Rotation of the camera housing in the vertical direction |
| Horizontal movement of the eyes | Rotation of the camera lens in the horizontal direction with reference to the camera housing |
| Vertical movement of the eyes | Rotation of the camera lens in the vertical direction with reference to the camera housing |
| Partially closing the eyes (e.g., squinting) | Zooming in on the scene (e.g., decreasing field of view) |
| Opening the eyes | Zooming out on the scene (e.g., increasing field of view) |

In one embodiment, the camera may include mechanical capability of rotating the camera housing 210 through 360° of rotation. The rotation of the camera housing 210 may be synchronized to the head movement. If the camera system 200 includes mechanical capability of rotating the lens 220 180° horizontally and 135° vertically, this rotation and motion may be synchronized to the eye movement. When the camera housing 210 and camera lens 220 movement mechanisms include limitations to adjust the camera settings to a desired degree, some of the changes to the captured image may be performed by software. For example, if the camera is not capable of moving the lens to change the zoom settings, software may be used to select an area of interest in the captured image to simulate adjustment of the zoom settings.

Figure 4:
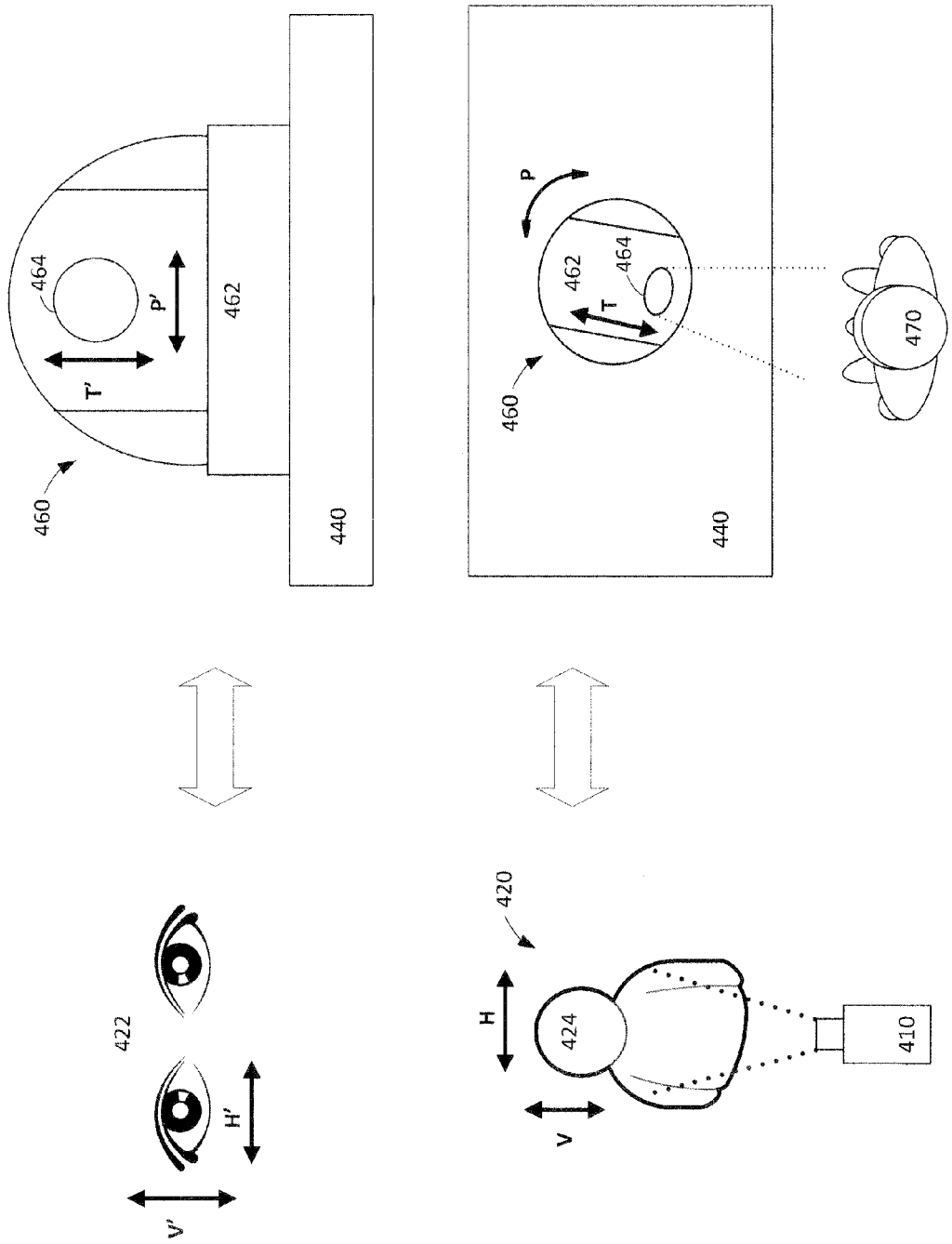
FIG. 4 illustrates an example of adjusting camera settings in response to detected eye movement and head movement according to an embodiment of the present disclosure.

FIG. 4 illustrates an example of adjusting camera settings in response to detected eye movement and head movement according to an embodiment of the present disclosure. As shown in FIG. 4, a first camera 410 may capture images of a first user 420. The image may be analyzed to determine the eye 422 and head 424 movement of the first user 420.

Based on the eye movement 422 of the first user 420, settings of a second camera 460 capturing images of a second user 470 may be adjusted. The camera settings adjusted in response to the eye movement may include the panning P' of the lens 464 with reference to the camera housing 462 in the horizontal direction and the tilting T' of the lens 464 with reference to the camera housing 462 in the vertical direction. The panning P' of the lens 464 may be adjusted based on the user's eye movement 422 in the horizontal direction H'. The tilting T' of the lens 464 may be adjusted based on the user's eye movement 422 in the vertical direction V'. The zoom setting of the camera lens 464 may be adjusted based on how wide the eye 422 are open or how long the eyes 422 are closed. In other embodiments, the zoom setting may be adjusted based on the gazing period at the same location.

Based on the head movement 424 of the first user 420, settings of the second camera 460 capturing images of the second user 470 may also be adjusted. The camera settings adjusted in response to the head movement 424 may include the rotation of the camera housing 462 in the vertical and/or horizontal direction. For example, the rotation of the camera housing 462 in the horizontal direction P may be adjusted based on the user's head movement and/or rotation in the horizontal direction H, the rotation of the camera housing 462 in the vertical direction T may be adjusted based on the user's head movement and/or rotation in the vertical direction V. In one embodiment, the camera 460 may be provided on a camera positioner 440 to adjust the position and rotation of the camera 460. The camera positioner 440 may adjust the position of the camera 460 in response to head movement of the first user 420.

In some embodiments, the head movement 424 may be estimated from the movement of the eyes within the captured images. In this embodiment, the movement of the eyes within the images can be used to control a first set of camera parameters and the movement of the pupils in the eyes (e.g., with reference to the corneal reflection(s)) may be used to control a second set of camera parameters.

Figure 5:
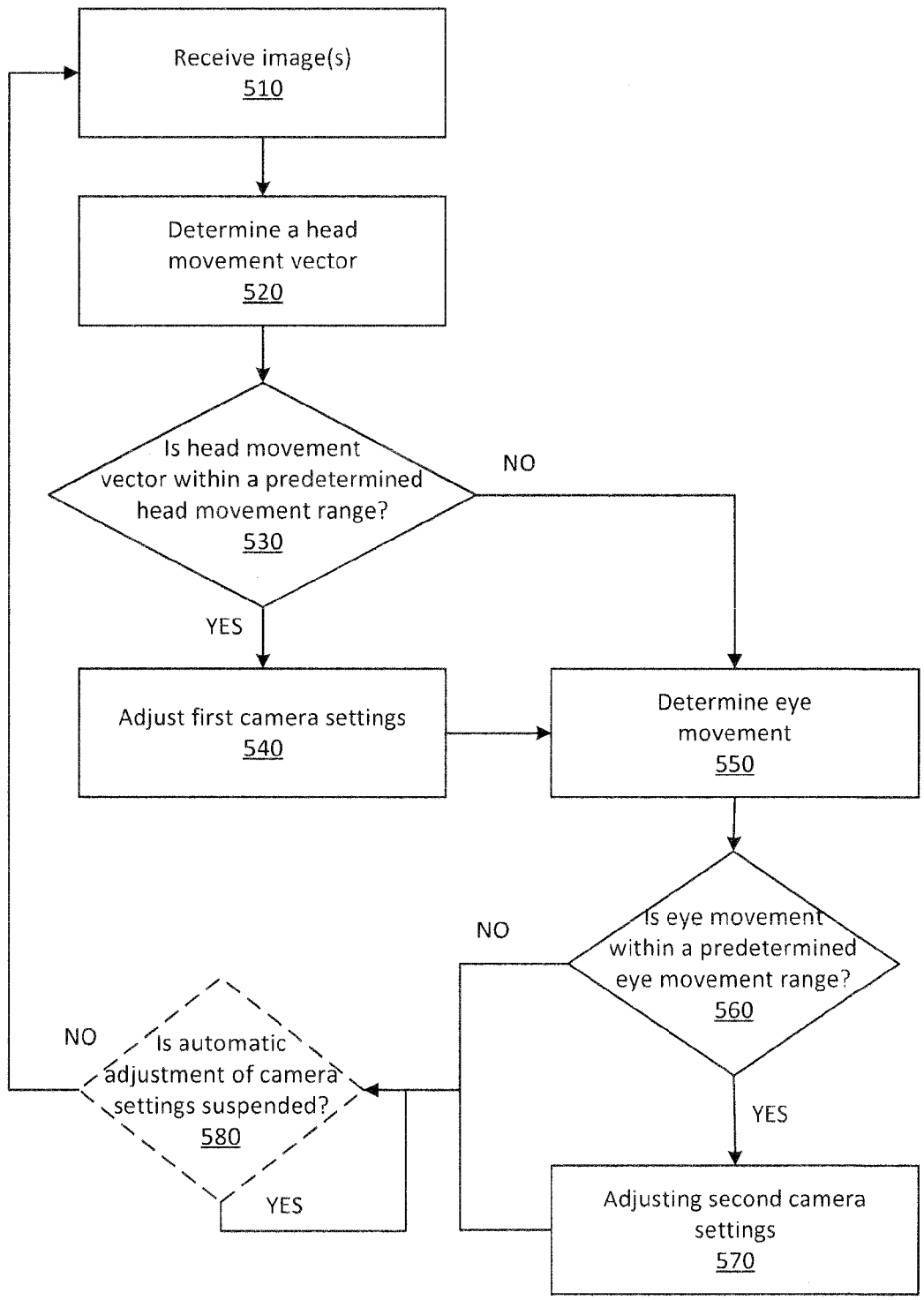
FIG. 5 illustrates a method for adjusting camera settings based on user movement according to another embodiment of the present disclosure.

FIG. 5 illustrates a method 500 for adjusting camera settings based on user movement according to another embodiment of the present disclosure. The method 500 may be performed with processor(s) associated with one or both of the cameras 110 and 160 shown in FIG. 1. The method 500 may include receiving images 510, determining a head movement vector 520, determining if the head movement vector is within a predetermined head movement range 630, adjusting first camera settings 540, determining eye movement 550, determining if the eye movement is within a predetermined eye movement range 560, and adjusting second camera settings 570.

The images may be received 510 from a first camera capturing images of a user. The first camera may be located in a different location from a second camera for which adjustments of the camera settings are performed. The images may be received periodically from the first camera or a continuous stream of images may be received from the first camera.

Determining a head movement vector 520 may include analyzing the received images to calculate an amount movement of the user's head between subsequent images. The determination of the amount of head movement between subsequent images may be made between adjacent images or between images that are captured at predetermined intervals (e.g., every two seconds). Based on the head movement in the images and/or the movement of other facial features, the head movement vector may be calculated. The head movement vector may represent the motion of the user's head in three dimensional space. For example, the vector may represent the approximate movement of the user head in the vertical direction, the horizontal direction and/or the depth direction. The vector may represent the amount of head motion in a predetermined time period (e.g., time period between when the two images used to determine the motion were captured). In addition to determining the head movement vector, the images may be analyzed to calculate the approximate rotation of the user's head.

The determination of whether the head movement vector is within a predetermined head movement range 530 may include comparing the magnitude of the head movement vector to the predetermined range. If the magnitude of the head movement vector exceeds the predetermined range, the head movement vector may represent very sudden head motion of the user. If the magnitude of the head movement is below the predetermined range, the head movement vector may represent very slow head movement. This step may filter out small amounts of head movements and/or large amounts of head movements that may otherwise control the second camera to provide very sudden or insignificant changes to the second camera and/or the displayed image.

When the magnitude is within the predetermined range, the head movement vector may represent intentional head movement and the head movement vector may be used to adjust the first camera settings of the second camera 540. The first camera settings of the second camera may include the tilting and/or panning provided by the camera housing. In another embodiment, the first camera settings may include the displacement of the camera in the vertical, horizontal and/or depth direction.

After the camera settings are adjusted based on the head movement vector or if the head movement vector is determined to be outside of the predetermined head movement range, the eye movement may be determined 550 from the received images. Determining the eye movement may include locating the eyes in subsequent images and detecting the location of the pupil in the eye (e.g., with reference to the corneal reflection(s)). The location of the pupil may indicate the gaze direction of the user. The gaze direction may be provided as a vector to be used to adjust the camera settings.

In one embodiment, the calculated eye movement may be provided as a vector differential angle of a previous position of the eye angle vector (e.g., from a previously analyzed image). The initial position of the eye at the center of the eye may be set to a horizontal angle of 0° and at a vertical angle of 0°. When the eye movement is detected in a subsequent image, the horizontal and vertical angles may be calculated from the previous angle vector (0, 0). The maximum angle of the human eye movement may be considered to be approximately 180° in the horizontal direction and approximately 135° in the vertical direction. When the user moves the eyes to the right most direction, the eye movement may be encoded as (0, 90) representing the vector differential angle from the angle vector (0, 0). When the user moves the eyes to the let most direction, the eye movement may be encoded as (0, −90) representing the vector differential angle from the angle vector (0, 0). When the user moves the eyes to the lowest most position, the eye movement may be encoded as (−67, 0) representing the vector differential angle from the angel vector (0, 0). Each of the angle vector values may be represented using 8 bit signed integer. The first bit may be used as the sign. The angle vector may be represented with 16 bits. In one embodiment, timestamp data may be added to the vector of the eye position and/or the head position for synchronization purposes.

The determination of whether the eye movement is within a predetermined eye movement range 560 may include comparing the amount of eye movement to the predetermined eye movement range. If the eye movement exceeds the predetermined range, the eye movement may represent very sudden eye motion of the user. If the eye movement is below the predetermined range, the eye movement may represent very slow eye movement. This step may filter out small amounts of eye movements and/or large amounts of eye movements that may otherwise control the second camera to provide very sudden or insignificant changes to the displayed image.

When the detected eye movement is within the predetermined eye movement range, the eye movement may represent intentional eye movement and the eye movement may be used to adjust the second camera settings of the second camera 570. The second camera settings may include the pan, tilt, and/or zoom settings of the lens of the second camera. The panning and/or tilting of the lens may be adjusted with reference to the camera housing of the second camera.

In an alternative embodiment, the eye movement may be determined and used to adjust the camera settings before adjusting the camera settings based on the determined head movement. In another embodiment, the first and second camera settings may be adjusted approximately simultaneously.

In one embodiment, the user may be provided with the ability to override the automatic adjustment of the camera settings 580. In this embodiment, in response to an input of the user observing images captured by the second camera, the automatic adjustment of the camera settings in response to the user motion may be suspended. When automatic adjustment of the camera settings is suspended, the second camera settings may be reset to default values or the camera settings may remain set to the settings at the time automatic adjustment is suspended. The automatic adjustment of the camera settings may be suspended for a period defined by the user or for a present time period (e.g., 15 seconds). During the time that automatic adjustment is suspended, the user may also be provided with controls (e.g., via a user interface or an input device) to manually control the settings of the camera.

In some embodiments, the user may be provided with controls to select which camera parameters will be automatically adjusted based on the detected user movement and which parameters will not be automatically adjustment based on the detected user movement. The user may also be provided with settings to adjust the sensitivity for each of the camera settings that may be automatically adjusted in response to the detected user movement. For example, the user may be provided with settings to control how fast the zoom is adjusted in response to a user motion. In one embodiment, the user may be provided with options to assign which camera parameter will be changed in response to detected head movement and which camera parameter will be changed in response to the detected eye movement.

Figure 6:
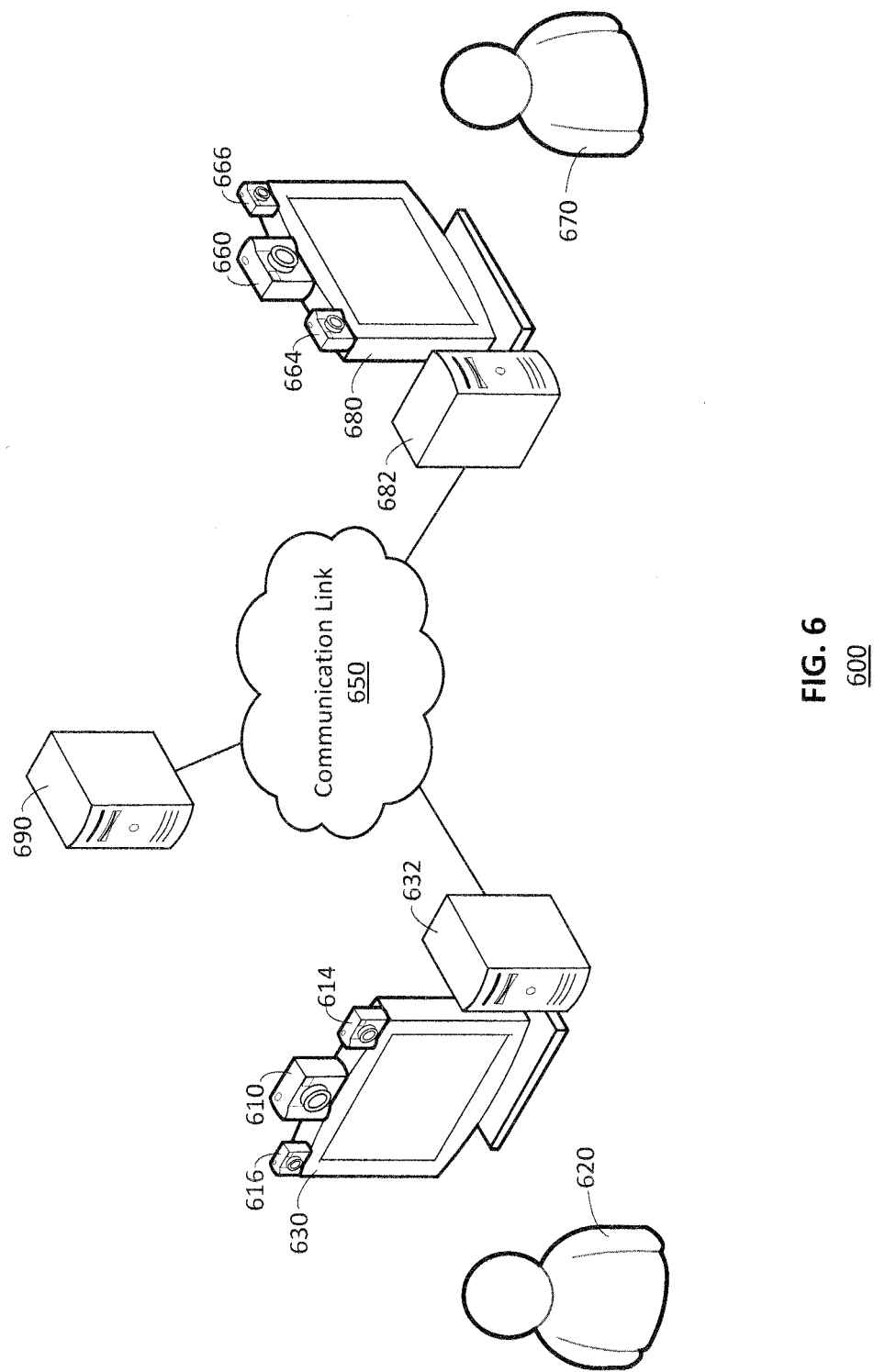
FIG. 6 illustrates a communication system according to an embodiment of the present disclosure.

FIG. 6 illustrates a communication system 600 according to an embodiment of the present disclosure. The communication system 600 may provide video conferencing for a plurality of users over a communication link 650. In the vicinity of a first user 620, the communication system 600 may include one or more first main cameras 610, one or more first tracking cameras 614 and 616, a first display 630, and a first processing system 632. In the vicinity of a second user 670, the communication system 600 may include one or more second main cameras 660, one or more second tracking cameras 664 and 666, a second display 680, and a second processing system 682. The first and second users may be disparately located from each other.

The first main camera 610 may capture images of the first user 620 and provide the images to the second display 680 to be displayed to the second user 670. The first main camera 610 may capture images of the first user 620 and adjust its settings based on movement of the second user 670 (e.g., head and/or eye movement) detected with the second set of tracking cameras 664, 666. The second processing system 682 may analyze the images captured by the tracking cameras 664, 666 to determine the movement of the second user 670 and, based on the movement, send adjusted camera settings to the first main camera 610. In other embodiments, the second processing system 682 may send the calculated user movement to the first main camera 610 or the first processing system 632.

The second main camera 660 may capture images of the second user 670 and provide the images to the first display 630 to be displayed to the first user 620. The second main camera 660 may capture images of the second user 670 and adjust its settings based on movement of the first user 620 (e.g., head and/or eye movement) detected with the first set of tracking cameras 614, 616. The first processing system 632 may analyze the images captured by the tracking cameras 614, 616 to determine the movement of the first user 670 and, based on the movement, send adjusted camera settings to the second main camera 660. In other embodiments, the first processing system 632 may send the calculated user movement to the second main camera 660 or the second processing system 682.

The communication system 600 may include a third processing system 690 receiving images from the tracking cameras 614, 616 and/or the tracking cameras 664, 666. The images may be analyzed to determine the movement of the first and second users. The third processing system 690 may also determine the camera parameters for the first main camera 610 and/or the second main camera 660 based on the determined motion of the users 620, 670. Providing the third processing system 690 may reduce the needed computation complexity for the components in the first and/or second systems.

While not shown in FIG. 6, the communication system 600 may be expanded to include additional users. In this embodiment, the display 630 and/or display 680 may display a plurality of users participating in the video conferences. The movement of each user may be used to control one or more of the main cameras associated with other user part of the communication system 600. In one embodiment, the system may determine at which portion of the screen the user is looking and control the main camera corresponding to the area on the screen the user is looking, based on the head and/or eye movement of the user. In another embodiment, the user may manually select which camera to control based on the detected motion of the user. For example, the first user 620 may select which of the displayed videos on the display 630, each displayed video corresponding to a different participant in the video conference, should be controlled by the movement detected by the first set of tracking cameras 614, 616.

The communication system 600 with more than two users may include a plurality of main cameras provided at one of the locations and each camera being controlled by a different user at the other locations. This set up may be used, for example, in an educational environment where multiple main cameras are positioned at the instructor's location and each student at different locations may be assigned to each of the main cameras. The detected motion of each of the students may be used to control the respective main camera assigned to the student.

Figure 7:
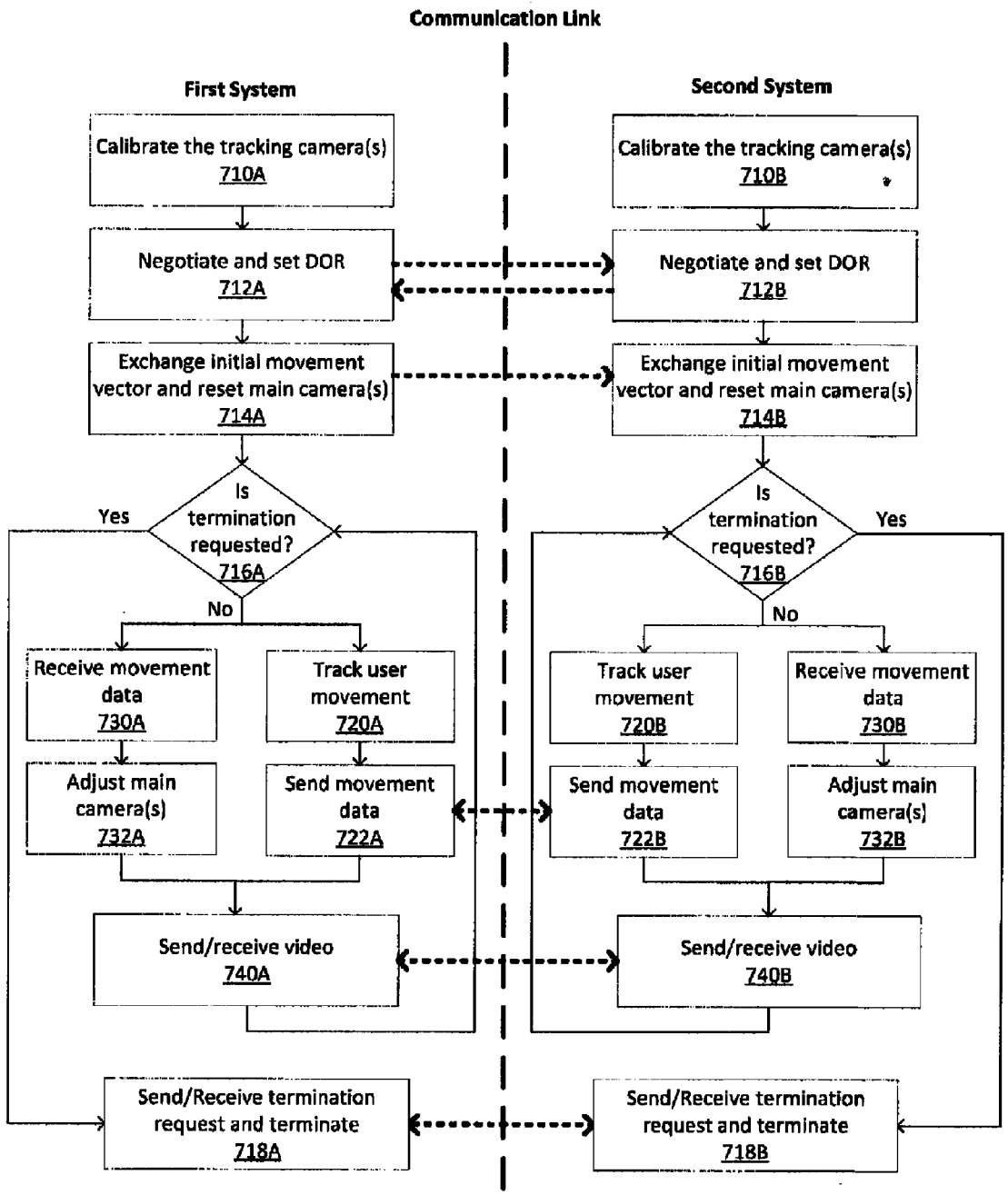
FIG. 7 illustrates a method of operation a communication system according to an embodiment of the present disclosure.

FIG. 7 illustrates a method 700 of operation of a communication system according to an embodiment of the present disclosure. The method 700 may be performed by a first system and a second system communicating over a communication link. The first system may include one or more main cameras (e.g., first main camera 610), one or more tracking cameras (e.g., first tracking cameras 614, 616), and a display (e.g., first display 630). The operations of the first system may be performed in real-time by one or more processors associated with the components of the first system. The second system may include one or more main cameras (e.g., second main camera 660), one or more tracking cameras (e.g., second tracking cameras 664, 666), and a display (e.g., second display 680). The operations of the second system may be performed in real-time by one or more processors associated with the components of the second system.

The method 700 may include calibrating the tracking camera(s) 710A, 710B. The calibration of the tracking camera(s) may include calibrating the cameras with a calibration pattern or with extracted points in the captured image(s). The calibration may provide mapping of corresponding points in images captured by different cameras. The calibration may allow for accurate measurements of distances to be extracted from the image(s). In some embodiment, the calibration may be optional (e.g., when accuracy is not important, when head and/or eye tracking system does not require calibration, or when the calibration is performed beforehand by the user or the system provider).

The method 700 may include negotiating and setting data output rate (DOR), which is discussed in more detail below. Negotiating and setting the DOR may determine the capabilities of each system and determine how and/or when data will be transmitted between the systems.

With the DOR negotiated, the systems may exchange initial movement vectors and reset the main camera(s) in each of the systems 714A, 714B. Exchanging the initial movement vectors may include exchanging the initial head and/or eye movement vectors. The initial head movement vector may be set to (0, 0) and the initial eye movement vector may be set to (0, 0) to reset the main camera(s). In one embodiment, the system may reset the initial movement vectors and reset the camera(s) in response to a reset signal received from the other system or initiated by the user of the system. Resetting the main camera(s) may include setting the position of the camera to a default position (e.g., centering the lens of the camera with respect to the camera housing or centering the user or object to be captured in the image).

In step 716A and 716B the determination may be made as to whether a termination request is received. The terminal request may be made by the user of the respective system or may be received from another system 718A or 718B. The termination request may be sent in response to the user closing a communication application or in response to losing a connection with the other system for a predetermined period of time. The termination may be initiated by other exceptional cases such as user's shutdown request and other shutdown events. The termination request may initiate a process to clean up resources and disconnect the connections.

The user movement may be tracked 720A and 720B by analyzing images captured by the tracking camera(s). The user movement may include head and/or eye movement. The images may be analyzed to determine movement data including head movement vector and/or the eye movement vector. The first system may analyze images captured by tracking cameras in the first system to determine movement of the first user. The second system may analyze images captured by tracking cameras in the second system to determine movement of the second user.

The detected movement data in each of the systems may be sent to the other system 722A and 722B and may include the head movement vector and/or the eye movement vector. Tracking the user movement and sending the movement data may be continuously performed until the termination is initiated. The movement data determined by the first system may be sent 722A by the first system periodically at predetermined intervals set during the negotiated DOR. At the same time, the first system may receive movement data 730A from the second system at the predetermined intervals. Similarly, the movement data determined by the second system may be sent 722B by the second system periodically at the predetermined intervals set during the negotiated DOR with consideration of buffering capabilities. The buffering capability will be determined by memory capacity, processing speed and other factors. The details of buffering mechanism are not discussed because it is commonly implemented for video conferencing and other two way communication. At the same time, the second system may receive movement data 730B from the second system at the predetermined intervals. Sending and receiving head and eye movement vector data may be synchronized using the negotiated DOR.

The first and second systems may each adjust their respective main camera(s) settings 732A, 732B based on the received movement data (e.g., head and/or eye movement data). The adjustment of the main camera(s) may be performed continuously in real time until a terminal request is received.

Until termination is initiated, the first and second systems may exchange video 740A, 740B captured by the main cameras of each system to be displayed on the displays of the other system. The video from each of the main camera(s) may be encoded before being transmitted over the communication link.

Figure 8:
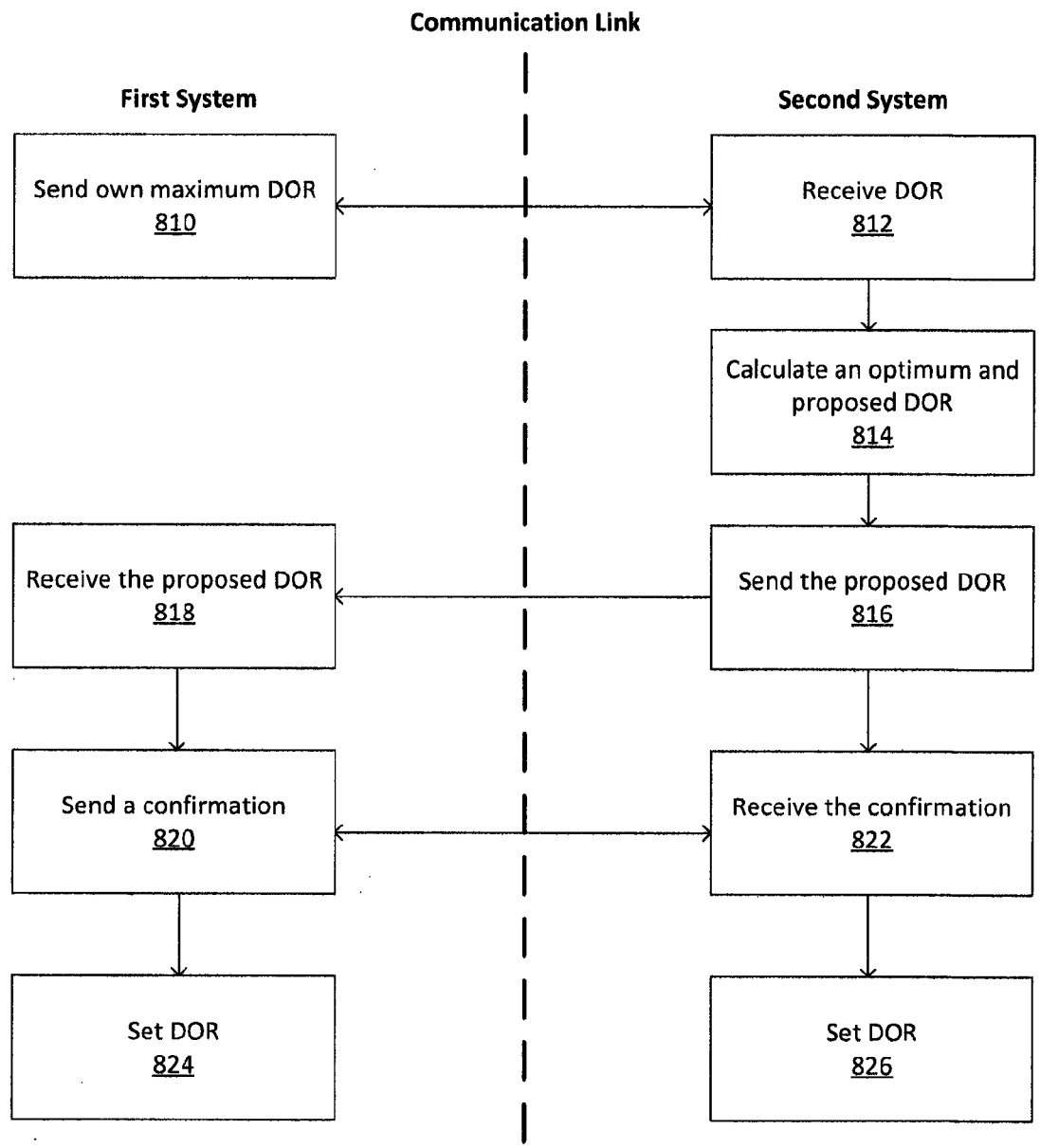
FIG. 8 illustrates a method for negotiating and setting data output rate (DOR) according to an embodiment of the present disclosure.

FIG. 8 illustrates a method 800 for negotiating and setting data output rate (DOR) according to an embodiment of the present disclosure. The method may be performed by processors associated with a first system and a second system communicating over a communication link. Setting the DOR may include determining the processing capabilities of each system and/or the communication capabilities. Once the capabilities of the systems are determined, the systems may negotiate the DOR according to method 800. The method 800 may be performed when communication is initiated and when changes in the processing and/or communication capabilities change.

The method 800 may include the first system sending its own maximum DOR to the second system 810. The first system may send its own maximum DOR in response to initiating the communication between the systems. The initiating packet may include the DOR and other capabilities of the system.

The second system may receive the DOR 812 from the first system and calculate its own optimal and proposed DOR 814. The proposed DOR may be sent 816 by the second system and received by the first system 818. In response to the received proposed DOR, the first system may determine if the proposed DOR is acceptable and send a confirmation 820 to the second system and set the its own DOR to the proposed DOR 824. The second system may receive the confirmation 822 from the first system indicating acceptance of the propose DOR and may set its own DOR to the proposed DOR 826. The agreed DOR may be stored for synchronizing the frequency of sending and receiving the user movement data and/or the camera parameters.

The system determining its own maximum DOR may include the system determining how often movement data will be generated by the system. The processor determining the user movement may periodically receive the image(s)

from the tracking camera(s) and produce an output representing the user movement extracted from the image(s). The processor may receive the images from the tracking camera(s) at less than the supported frame rate of the tracking camera(s). The maximum output rate (MR) of the movement data may be provided by the tracking camera frame rate (FR) less the processing time (EP) to determine the user movement. The maximum output rate (MR) may be represented by:

$$MR = ER - \left(\frac{EP}{1000}\right),$$

where EP is represented in milliseconds. The optimum output rate MR does not need to be fixed. It may be adjusted with the changes in availability of processing resources and may be input by the user during the setup of the system. The optimum output rate MR may be synchronized (e.g., by handshaking) with other system receiving the movement data and/or providing its own movement data.

The packet exchange between the systems for the DOR negotiation may use Extensible Markup Language (XML), but is not so limited. The initiation XML packet format may include:

```
<DOR type="initiation">
<initiation party="name of the initiator" ip="ip address"
maxDOR="maximum DOR"
3D="3D capabilities"/>
</DOR>
```

The proposed DOR may be calculated, for example, by Proposed DOR=Min(DOR1, DOR2), wherein DOR 1 is the communication initiator's maximum DOR and DOR2 is the communication responder's maximum DOR. The initiators may send the following XML packet to propose the DOR:

```
<DOR type="DORset">
  <dor set="proposed DOR"/>
</DOR>
```

The response packet may provide whether or not the proposed DOR is accepted by the following XML packet:

```
<DOR type="Response">
  <dor response="agreed or disagree"/>
</DOR>
```

To finalize the DOR, the following XML packet may be sent:

```
<DOR type="confirm">
  <dor rate="agreed DOR"/>
</DOR>
```

The movement data (e.g., the head and/or eye movement vector data) may be sent in the following XML packet:

```
<EMDE>
  <movement head="movement angle vector" eye="movement
  angle vector"
sequence="numeric sequence" timestamp="current timestamp"/>
</EMDE>
```

The XLM packet with the movement data may be exchanged periodically as agreed in the DOR. Sequence number and timestamp may be included in the packet for synchronization purposes. For example, the initial movement data packet from the initiator may be:

```
<EMDE>
  <movement head="0,0", eye="0,0" sequence="1" timestamp=
  "0331101671132">
</EMDE>
```

The processor(s) may provide an eye movement camera controller (EMCC) that gets the DOR data and controls the main camera(s) movement (e.g., position and angle) to synchronize to the user's movement (e.g., head and eye movement). EMCC may interface the main camera(s) using the camera control interface Application Programming Interface (API) if the API is offered by the main camera(s). In this case, the camera(s) may have the capability of zoom, pan and/or tilt. If the main camera(s) is not capable of zoom, pan and/or tilt (e.g., by using step motors), the EMCC may mimic the camera(s) movement by transforming the captured image with software (e.g., by area sampling and perspective transformations). The zooming of the main camera may be determined by the gazing period. When the main camera(s) have 3D capabilities, the distance from the object (e.g., user's head or eyes) may be imbedded in the XML packet as follows:

```
<EMDE>
  <movement head="movement angle vector" eye="movement
  angle vector"
distance="distance" sequence="numeric sequence" timestamp=
"current timestamp"/>
</EMDE>
```

According to one embodiment, initially, the tracking camera(s) (e.g., tracking cameras 614, 616, 664 and 666 tracking head and/or eye movement) may be stationed or imbedded near the users. When the initialization step is completed, the first user of the first system may initiate a connection request to the second system used by the second user. The connection request may be made by using a TCP socket connection call according to the following pseudo code, but is not so limited:

```
Make a socket call to get a socket instance
If the socket call returns a valid socket instance then
    Make a connect call with the second user information
    If the output result of the connect call is OK then
        Return with the socket instance
    Else
        Return with error
    EndIf
Else
    Return with error
EndIf
```

The second system used by the second user may wait for a connection request according to the following pseudo code, but is not so limited:

```
Get a server socket instance
If the returned socket instance is valid then
    Reserve a port number
```

```
If the returned port number is valid then
    Do while no shutdown request entered
        Accept connection if there is one
            Go to process routine with the connection
            request information
    EndDo
Else
    Return with error
EndIf
```

The first system may receive a positive response from the second system, when the second system accepts a connection request. When the connection is established between the first and second systems, the next step may include determining the data output rate (DOR), for example, by the method discussed with reference to FIG. 8. The pseudo code of the first system for DOR negotiation and setting process may be provided as follows, but is not so limited:

```
Send own DOR
Do while no shutdown process initiated
    Check to see if any outstanding packets awaiting to receive
    If there is a packet to receive and it is the proposed DEOR from
    User B
then
        Receive the proposed DOR
        Send a confirmation acknowledgement
        Set and record DOR to use
    Else
        Optional pause
    EndIf
EndDo
```

The pseudo code of the second system for DOR negotiation and setting process may be provided as follows, but is not so limited:

```
Receive User A's maximum DOR
Calculate the optimum and proposed DOR
Send the proposed DOR to User A
Do while no shutdown process initiated
    If there is a packet to receive and it is the
    confirmation from User A then
        Set and record DOR to use
    Else
        Optional pause
    EndIf
EndDo
```

With the DOR setting process complete, the next step may include exchanging the initial head and eye movement vectors to reset the main camera(s). The initial vector data may be set to (0, 0) for the head movement and to (0, 0) for the eye movement. The next step may include tracking the head and/or eye movement and sending the movement vector data periodically until the termination initiated. The frequency of sending the head and/or eye movement vector data may be pre-determined by the negotiated DOR. At the same time, each system may receive the head and/or eye movement vector data from the other system and adjust the main camera(s) accordingly until termination is initiated. Sending and receiving the head and/or eye movement vector data may be synchronized using the DOR timer.

The main camera(s) may also exchange video streams to display on the display screens of each of the system. The video streams may be displayed on the display screens and the tracking camera(s) track the head and/or eye movement of the user watching the displayed video stream. When either system enters a termination request, the termination request may initiate a termination process to clean up resources and disconnect the connection.

Adjusting the main camera(s) mechanisms may be described in pseudo code as follows, but is not so limited:

```
Get X value of the head movement vector
If X value of the head movement vector is greater than a threshold value
    Send a signal to the main camera to move the camera housing via a first
rail
EndIf
Get Y value of the head movement vector
If Y value of the head movement vector is greater than a threshold value
    Send a signal to the main camera to move the camera housing via a second
rail
EndIf
Get X value of the eye movement vector
If X value of the eye movement vector is greater than a threshold value
    Send a signal to the main camera FIG. 4 to move the camera lens
EndIf
Get Y value of the eye movement vector
If Y value of the eye movement vector is greater than a threshold value
    Send a signal to the main camera to move the camera lens
EndIf
If both X and Y value of the eye movement vector is less than the threshold value in
the predetermined rate
    Send a signal to zoom the main camera
EndIf
```

The threshold values may be predefined to prevent the main camera(s) from shaking and to remain stable. The mechanism to calculate if the movement is out of threshold may be defined by the following, but is not so limited:

XM1−XM2<XMH: Ignore
XM1−XM2>XMH: Send a signal to move
YM1−YM2<YMH: Ignore
YM1−YM2>YMH: Send a signal to move
XE1−XE2<XEH: Ignore
XE1−XE2>XEH: Send a signal to move
YE1−YE2<YEH: Ignore
YE1−YE2>YEH: Send a signal to move
Where,
XMH is threshold of X value of the head movement
XM1 is X value of the previous head movement
XM2 is X value of the current head movement
YMH is threshold of Y value of the head movement
YM1 is Y value of the previous head movement
YM2 is Y value of the current head movement
XEH is threshold of X value of the eye movement
XE1 is X value of the previous eye movement
XE2 is X value of the current eye movement
YEH is threshold of Y value of the eye movement
YE1 is Y value of the previous eye movement
YE2 is Y value of the current eye movement Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols.

The above-illustrated software components may be tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

In the above description, numerous specific details are set forth to provide a thorough understanding of embodiments of the invention. The invention is capable of other embodiments and of being practices and carried out in various ways. One skilled in the relevant art will recognize, however that the invention can be practiced without one or more of the specific details or with other methods, components, techniques, etc. In other instances, well-known operations or structures are not shown or described in details to avoid obscuring aspects of the invention. Also, it is to be understood that the phraseology and terminology employed herein are for the purpose of the description and should not be regarded as limited.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

We claim:

1. A system comprising:
a first camera configured to capture images of a user;
a display associated with the first camera, the display configured to display, in real time, video received from a second camera disparately located from the first camera; and
one or more processors coupled to the first camera and the display,
the processor(s) configured to:
analyze the images captured by the first camera to determine at least one of a head movement or an eye movement of the user, the analyzing the images including:
detecting the eye in a subsequent image, and
calculating a displacement of a pupil of the eye in the subsequent image;
determine a first camera parameter for the second camera based on the head movement of the user;
determine a second camera parameter for the second camera based on the eye movement of the user; and
transmit, to the second camera, the first camera parameter and the second camera parameter.

2. The system of claim 1, wherein the first camera parameter adjusts a physical displacement of the second camera, and the second camera parameter adjusts zooming of the second camera.

3. The system of claim 1, wherein the first camera parameter controls displacement of the second camera and the second camera parameter controls a zoom setting of the second camera.

4. The system of claim 1, further comprising:
a communication link configured to couple the display and the second camera, the second camera being configured to adjust the second camera based on the first camera parameter and the second camera parameter and configured to transmit the video to the display over the communication link.

5. The system of claim 4, wherein the second camera includes a pan-tilt-zoom (PTZ) camera disposed on a camera positioner configured to adjust a physical position of the PTZ camera.

6. The system of claim 5, wherein the second camera parameter includes a camera setting for the PTZ camera to control at least one of panning, tilting and zooming, the first camera parameter includes a camera setting for the camera positioner to adjust the physical position of the PTZ camera.

7. The system of claim 1, wherein the one or more processors are further configured to receive video from the second camera and, before displaying the video on the display, processing the video to modify content of the video for display based at least on the determined head movement or the eye movement of the user.

8. A non-transitory computer readable storage medium storing an information processing program executed by a computer of a communication system, the information processing program, when executed, causing the computer to perform at least:
   receiving a plurality of images captured by a first camera, the images including a user;
   analyzing the plurality of images captured by the first camera to determine at least one of a head movement or an eye movement of the user, the analyzing the images including:
      detecting the eye in a subsequent image, and
      calculating a displacement of a pupil of the eye in the subsequent image; and
   based on the at least one of the head movement or the eye movement of the user, processing at least one of the plurality of images to mimic mechanical movement of at least one of the camera housing or lens of a second camera.

9. The non-transitory computer readable storage medium of claim 8, wherein the processing mimics physical displacement of the second camera and a zoom setting of the second camera.

10. The non-transitory computer readable storage medium of claim 9, wherein the processing mimics a tilt setting and a pan setting.

11. The non-transitory computer readable storage medium of claim 8, wherein the analyzing the images captured by the first camera to determine the head movement includes:
   detecting the head in a subsequent image, and
   calculating displacement of the head in the subsequent image.

12. The non-transitory computer readable storage medium of claim 8, wherein analyzing the images captured by the first camera to determine the eye movement includes calculating the displacement of a center of the pupil with reference to a corneal reflection in the subsequent image.

13. The non-transitory computer readable storage medium of claim 8, further causing the computer to perform:
   receiving video captured by the second camera associated with a first system; and
   processing the video to modify content of the video for display in a second system associated with the first camera based at least on one of the determined head movement and eye movement of the user at the first camera.

14. A computer implemented method comprising:
   receiving a plurality of images including a user captured by a first camera included in a first system;
   negotiating a data output rate with a second system including a second camera;
   extracting user motion information from the plurality of images captured by the first camera, the extracted motion information including at least one of head movement of the user or eye movement of the user;
   sending a camera parameter configured to trigger an adjustment of the second camera based on the at least one of the head movement or the eye movement of the user and the data output rate, the sending of the camera parameter is based on a frequency based on the data output rate, the data output rate is based on a rate of user motion information generation.

15. The method of claim 14, wherein adjusting the camera parameter includes adjusting a physical position of the second camera based on the determined head movement.

16. The system of claim 1, wherein the eye movement has a direction estimated by analyzing a single image from the images of a user.

17. The method of claim 14, wherein the data output rate is based on a rate of user motion information generation.

18. The system of claim 1, wherein the eye movement is at least one of a duration of an eye gaze or a partial closing of an eye.

19. The non-transitory computer readable storage medium of claim 8, wherein the eye movement is at least one of a duration of an eye gaze or a partial closing of an eye.

* * * * *